(12) United States Patent
Charles et al.

(10) Patent No.: US 10,985,694 B2
(45) Date of Patent: Apr. 20, 2021

(54) METHOD AND APPARATUS FOR DETERMINING KEY PERFORMANCE PHOTOVOLTAIC CHARACTERISTICS USING SENSORS FROM MODULE-LEVEL POWER ELECTRONICS

(71) Applicant: Enphase Energy, Inc., Petaluma, CA (US)

(72) Inventors: Nathan Charles, Lancaster, PA (US); Benjamin Lewis Smith, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 225 days.

(21) Appl. No.: 15/651,409

(22) Filed: Jul. 17, 2017

(65) Prior Publication Data

US 2018/0034411 A1     Feb. 1, 2018

Related U.S. Application Data

(60) Provisional application No. 62/362,676, filed on Jul. 15, 2016.

(51) Int. Cl.
*H02S 50/10*     (2014.01)

(52) U.S. Cl.
CPC .................... *H02S 50/10* (2014.12)

(58) Field of Classification Search
CPC ...................................... H02S 50/10
USPC .......................................... 702/60
See application file for complete search history.

(56) References Cited

U.S. PATENT DOCUMENTS

| 8,239,149 | B2 * | 8/2012 | Nuotio | H02S 50/10 307/18 |
| 8,473,250 | B2 * | 6/2013 | Adest | G01D 4/004 702/182 |
| 9,160,172 | B2 | 10/2015 | Caffrey et al. | |
| 2010/0106339 | A1 * | 4/2010 | Little | H02S 50/00 700/293 |
| 2011/0066401 | A1 | 3/2011 | Yang et al. | |

(Continued)

OTHER PUBLICATIONS

King et al. "Photovoltaic Array Performance Model", 2003, Sandia National Laboratories, pp. 1-39. (Year: 2003).*

(Continued)

*Primary Examiner* — Hien D Khuu
(74) *Attorney, Agent, or Firm* — Moser Taboada

(57) ABSTRACT

A method and apparatus for using MLPE data for characterizing real-world operation a PV module. In one embodiment, the method comprises obtaining a plurality of temperature measurements, wherein each temperature measurement is a measure, by an MLPE proximate to a PV module, of temperature; obtaining a plurality of DC voltage measurements, wherein each DC voltage measurement of the plurality of DC voltage measurements is a measure by the MLPE of a DC voltage of the PV module; obtaining a plurality of DC current measurements, wherein each DC current measurement of the plurality of DC voltage measurements is a measure by the MLPE of a DC current of the PV module; obtaining racking design information with respect to the PV module; and determining a plurality of PV module temperatures for the PV module based on the plurality of temperature measurements and the racking design information.

20 Claims, 11 Drawing Sheets

(56) References Cited

U.S. PATENT DOCUMENTS

| | | |
|---|---|---|
| 2011/0184583 A1 | 7/2011 | El-Barbari et al. |
| 2012/0215372 A1 | 8/2012 | Kernahan et al. |
| 2012/0296584 A1* | 11/2012 | Itoh .................. G05F 1/67 702/58 |
| 2014/0136178 A1 | 5/2014 | Meagher et al. |
| 2015/0088440 A1 | 3/2015 | Chen et al. |
| 2015/0094969 A1 | 4/2015 | Jungerman |
| 2017/0104447 A1* | 4/2017 | Bintz .................. H04B 17/309 |

OTHER PUBLICATIONS

Hossain et al, "Microinverter Thermal Performance in the Real-World: Measurements and Modeling", 2015, PLoS One, p. 1-17. (Year: 2015).*

Riley et al. "Testing and Characterization of PV Modules with Integrated Microinverters", 2013, IEEE, p. 809-0814. (Year: 2013).*

Riley "Performance model for characterizing AC modules and predicting their power", 2015, IEEE, p. 1-6. (Year: 2015).*

Mohammad Akram Hossain et al., "Microinverter Thermal Performance in the Real-World: Measurements and Modeling", Plos One, Jul. 6, 2015, pp. 1-17.

Daniel Mark Riley et al., "A Performance Model for Photovoltaic Modules with Integrated Microinverters", Sandia Report, Jan. 2015, 55 pgs.

Mohammad A. Hossain et al., "Predictive Linear Regression Model for Microinverter Internal Temperature", pp. 1-5.

Yang Hu, "PV Module Performance Under Real-World Test Conditions—A Data Analytics Approach", Thesis, Department of Materials Science and Engineering, Case Western Reserve University, May 2014, 91 pgs.

Dr. J. Abdul Jaleel et al., "Simulation on Maximum Power Point Tracking of the Photovoltaic Module using LabVIEW", International Journal of Advanced Research in Electrical, Electronics and Instrumentation Engineering vol. 1, Issue 3, Sep. 2012, 10 pgs.

* cited by examiner

METHOD AND APPARATUS FOR DETERMINING KEY PERFORMANCE PHOTOVOLTAIC CHARACTERISTICS USING SENSORS FROM MODULE-LEVEL POWER ELECTRONICS

CROSS-REFERENCE TO RELATED APPLICATIONS

This application claims benefit of U.S. provisional patent application Ser. No. 62/362,676, filed Jul. 15, 2016, which is herein incorporated in its entirety by reference.

BACKGROUND OF THE INVENTION

Field of the Invention

Embodiments of the present disclosure relate generally to determining photovoltaic performance characteristics and, in particular, to determining photovoltaic performance characteristics using data from local power electronics.

Description of the Related Art

Photovoltaic (PV) module manufacturers typically characterize PV modules based on Standard Test Conditions (STC) at which the PV modules are tested. For example, PV module voltage and current output may be measured under standard test conditions (STC) of 25° C. temperature, 1000 W/m² irradiance, and 1.5 air mass in order to determine key PV module parameters that are then published by the manufacturer in a datasheet for the PV module.

The determined PV module datasheet parameters, which may include maximum power point (MPP) voltage (Vmp) at STC, MPP current (Imp) at STC, and a temperature coefficient (tkVmp) to modify Vmp for different operating temperatures, may then be used by solar power system users to determine expected system behavior, such as an expected power output.

However, actual PV module output under real-world operating conditions may vary from expected PV module output that is based on module characterization done under test conditions, resulting in an unrealistic expected system power output during real-world operation. Additionally, in order to determine real-world expected PV module behavior, some system users may need to obtain information from a variety of sources, such as weather stations for determining temperature local to the PV system, making it cumbersome to determine an expected system behavior.

Therefore, there is a need in the art for efficiently determining real-world PV module operating characteristics.

SUMMARY OF THE INVENTION

Embodiments of the present invention generally relate to a method and apparatus for determining photovoltaic performance characteristics using data from local power electronics substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for using module-level power electronics (MLPE) located proximate one or more PV modules to infer at least one PV module operating characteristic under real-world operating conditions. In some embodiments, such as the embodiment described below, the MLPE is a DC-AC power conditioner (which may also be referred to as a microinverter) that is coupled to a PV module and measures temperature, DC current and DC voltage. In certain embodiments, data from a plurality of MLPEs, such as a plurality of microinverters coupled to a plurality of PV modules at a distributed energy resource (i.e., a solar power system installation site), may be used for determining one or more PV module operating characteristics.

Using the MLPE data, statistical analysis as well as various algorithms can be applied to characterize the PV module in real-world operating conditions for both an instantaneous point in time (e.g., for benchmarking PV performance against manufacturer specifications, verifying individual PV module and/or system performance for contractual purposes, and the like) as well as determining performance over time (e.g., for determining when to perform operations and maintenance work). For example, for solar power system installations that are remotely located and/or difficult to access, the system user can remotely characterize the operating behavior of the system's PV modules without having to access the site, install additional sensors at the site, collect a cumbersome amount of data related to the site, or the like.

In one or more embodiments, ambient temperature, DC current, and DC voltage are measured by one or more MLPEs. The measured MLPE data is used along with metadata pertaining to the MLPE/PV module site to characterize the corresponding one or more PV modules instantaneously and/or over time.

Figure 1:
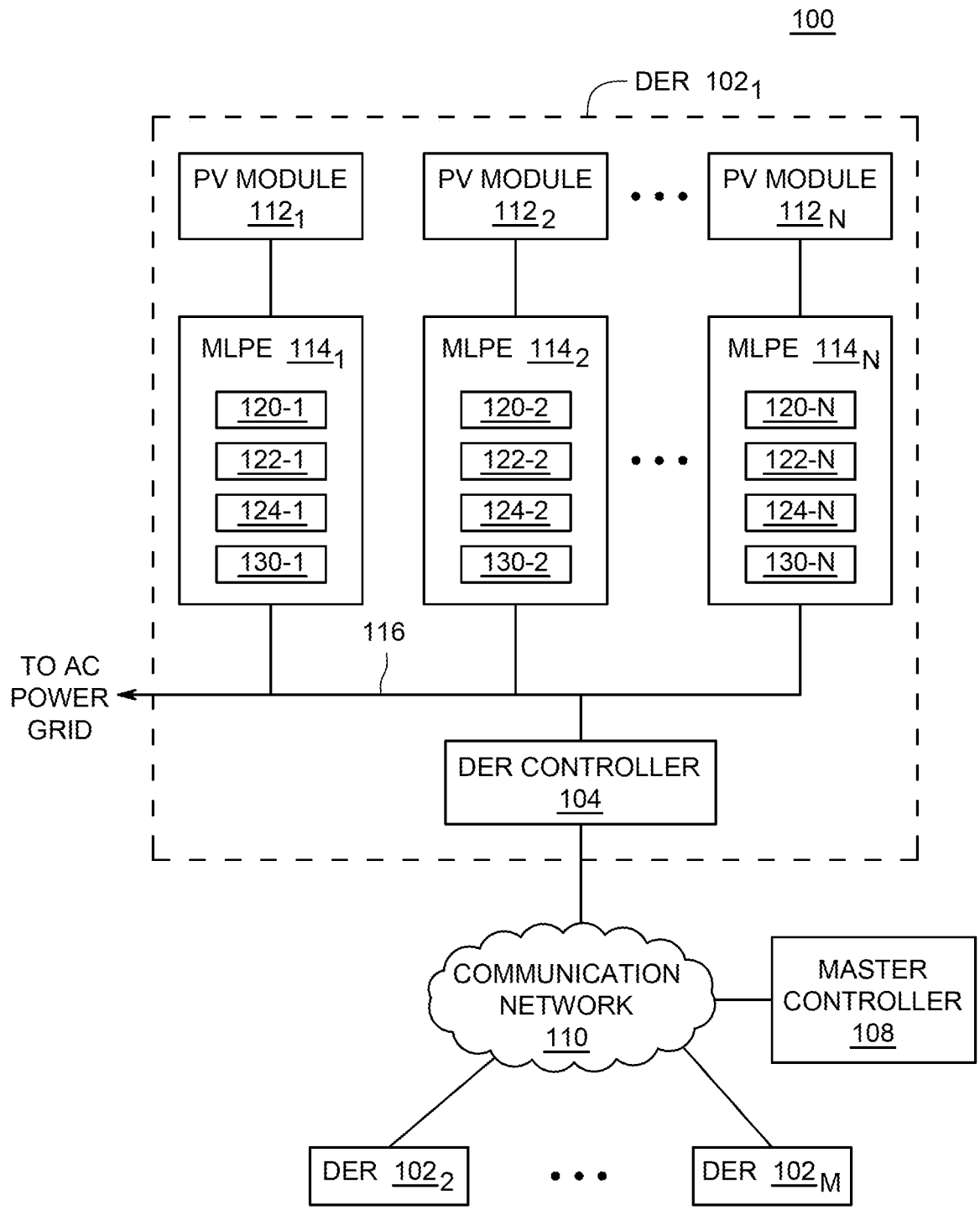
FIG. 1 is a block diagram of a power generation system in accordance with one or more embodiments of the present invention.

FIG. 1 is a block diagram of a power generation system 100 ("system 100") in accordance with one or more embodiments of the present invention. The system 100 comprises a plurality of distributed energy resources (DERs) $102_1$, $102_2$, . . . , $102_M$, (collectively referred to as DERs 102), a plurality of DER controllers $104_1$, $104_2$, . . . , $104_N$, (collectively referred to as DER controllers 104), a master controller 108, and a communications network 110. Each of the DERs 102 is communicatively coupled to a corresponding DER controller 104, which are communicatively coupled to the master controller 108 via the communication network 110 (e.g., the Internet). Although only the DER $102_1$ is depicted in detail in FIG. 1 and described herein, the DERs $102_2$-$102_M$ are analogous to the DER $102_1$, although the number and/or type of various DER components may vary.

The DERs 102 each comprise a plurality of PV modules $112_1$, $112_2$, . . . , $112_N$, (collectively referred to as PV modules 112) which generate DC power from solar energy. In some embodiments, one or more of the DERs 102 may additionally or alternatively comprise other types of renewable energy sources, such as for wind energy, hydroelectric energy, and the like, for generating DC power.

Each of the DERs 102 further comprises a plurality of module-level power electronics $114_1$, $114_2$, . . . , $114_N$, (collectively referred to as module-level power electronics 114, MLPE 114, or simply power electronics 114). Each of the MLPEs $114_1$, $114_2$, . . . $114_N$ is coupled to a PV module $112_1$, $112_2$, . . . $112_N$, respectively, in a one-to-one correspondence, although in some alternative embodiments one or more of the MLPEs 114 may be coupled to multiple PV modules 112. Each of the MLPEs $114_1$, $114_2$, . . . $114_N$ comprises an MLPE controller $130_1$, $130_2$, . . . $130_N$, (collectively referred to as MLPE controllers 130) for controlling the corresponding MLPE 114.

In some embodiments, such as the embodiment described below, the MLPEs 114 may be DC-AC inverters that convert DC power from the corresponding PV modules 112 to grid-compliant AC power and couple the generated power to an AC bus 116 that is coupled to one or more of an AC power grid (e.g., a commercial AC power grid), loads, a system for power storage, and the like. In other embodiments, each of the MLPEs 114 may be another type of power converter or power conditioner, such as DC-DC converters, AC-AC converters, and the like.

The DER controller 104 is also coupled to the AC bus 116 (which may be referred to as a "local grid"). Generally, the DER controller 104 communicates with the MLPEs 114 via the AC bus 116 using power line communications (PLC), although additionally or alternatively other types of wired communication and/or wireless communication may be used. Each of the DER controllers 104 collects information regarding the health and performance of components of the corresponding DER 102, such as measurements of power generated by the corresponding MLPEs 114, power consumed from one or more components of the DER 102, deactivation of the components, alarm and alert messages, and the like. Some or all of the information may be collected periodically and/or in real-time.

The collected information is communicated from the DER controllers 104 to the master controller 108 where it may be analyzed and/or reported in real time; additionally or alternatively some or all of the received information may be stored for subsequent data analysis and/or report generation. In some embodiments, some or all of the collected information may be communicated in real-time to the master controller 108.

In addition to receiving information from the MLPEs 114, the DER controllers 104 and/or the master controller 108 may communicate information to the MLPEs 114, such as control and command instructions.

Each of the MLPEs $114_1$ . . . $114_N$ comprises a temperature sensor $120_1$ . . . $120_N$, respectively, for measuring ambient temperature. Each of the MLPEs $114_1$ . . . $114_N$ further comprises a corresponding DC voltage monitoring circuit $122_1$ . . . $122_N$ and a corresponding DC current monitoring circuit $124_1$ . . . $124_N$ for measuring DC voltage and DC current, respectively, from the corresponding PV module 112. In one or more embodiments, the measured temperature and measured voltages each have an associated time-stamp for identifying when the measurement was taken. The measured temperature, DC voltage and DC current may be referred to as the measured MLPE data or MLPE measurements.

In accordance with one or more embodiments of the present invention, the measured temperature, DC voltage and DC current is used to characterize one or more of the PV modules 112 instantaneously and/or over time as described below. In some embodiments, additional metadata about the site where the DER 102 is located may be used in characterizing the PV modules 112; such metadata may be acquired using a variety of different techniques.

In one or more particular embodiments, values for PV module maximum power point (MPP) voltage (Vmp), PV module MPP current (Imp), and a temperature coefficient (tkVmp) to modify Vmp for different operating temperatures are calculated using the measured temperature, DC voltage and DC current as described below with respect to FIG. 5. Site metadata (either measured or inferred) and a temperature model are used to relate the measured MLPE temperature data to PV module temperature. The resulting modeled PV module temperature is then used along with measured DC voltage and DC current to determine Vmp, Imp, and tkVmp for characterizing one or more PV modules 112 instantaneously and/or over time.

Figure 2:
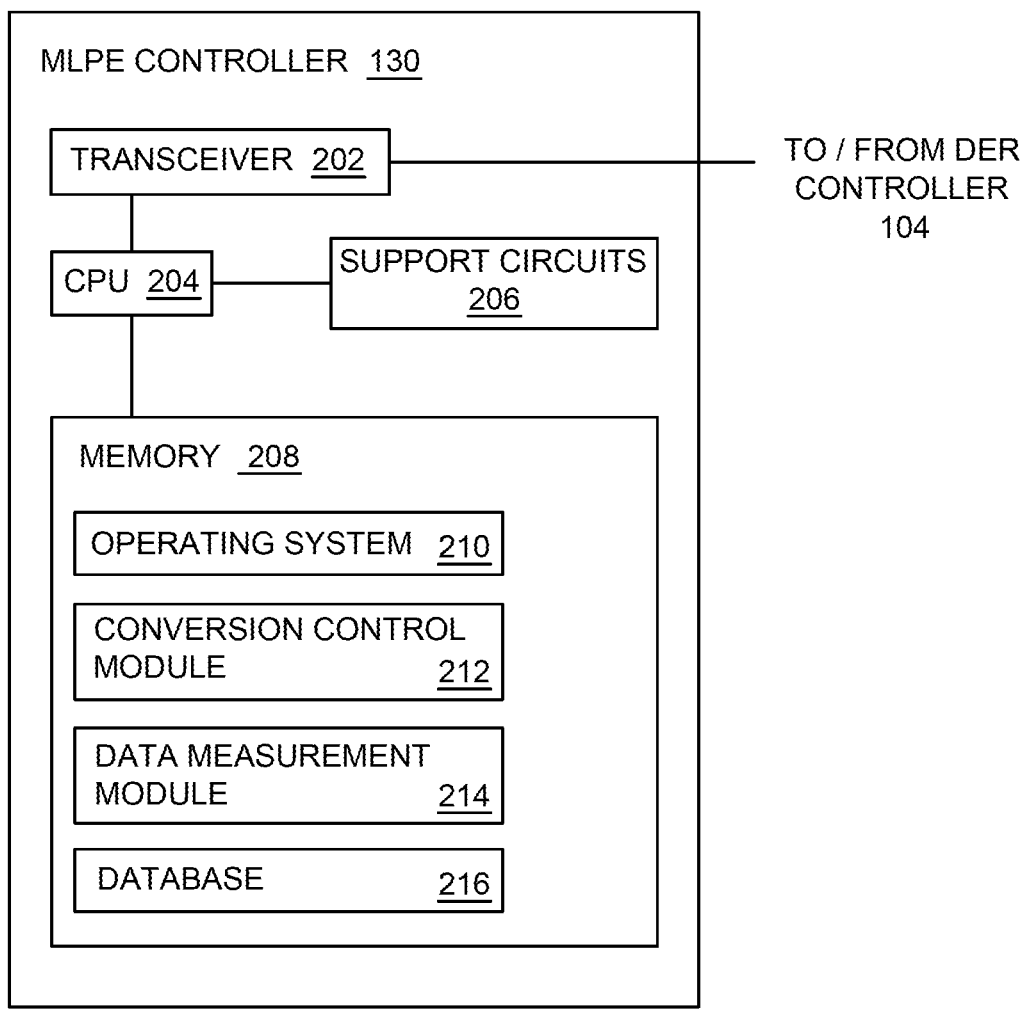
FIG. 2 is a block diagram of an MLPE controller in accordance with one or more embodiments of the present invention.

FIG. 2 is a block diagram of an MLPE controller 130 in accordance with one or more embodiments of the present invention. The MLPE controller 130 comprises at least one central processing unit (CPU) 204 coupled to each of a memory 208, support circuits 206 (i.e., well known circuits used to promote functionality of the CPU 204, such as a cache, power supplies, clock circuits, buses, input/output (I/O) circuits, and the like), and a transceiver 202 that is communicatively coupled to the DER controller 104.

The CPU 204 may comprise one or more conventionally available microprocessors or microcontrollers. The MLPE controller 130 may be implemented using a general purpose computer that, when executing particular software, becomes a specific purpose computer for performing various embodiments of the present invention. In one or more embodiments, the CPU 204 may be a microcontroller comprising internal memory for storing controller firmware that, when executed, provides the controller functionality described herein. In some embodiments, the MLPE controller 130 may additionally or alternatively comprise one or more application specific integrated circuits (ASIC) for performing one or more of the functions described herein.

The memory 208 may comprise random access memory, read only memory, removable disk memory, flash memory, and various combinations of these types of memory; the memory 208 is sometimes referred to as main memory and may, in part, be used as cache memory or buffer memory. The memory 208 generally stores an operating system (OS) 210, such as one of a number of available operating systems for microcontrollers and/or microprocessors (e.g., LINUX, Real-Time Operating System (RTOS), and the like). The memory 208 further stores non-transient processor-executable instructions and/or data that may be executed by and/or used by the CPU 204. These processor-executable instructions may comprise firmware, software, and the like, or some combination thereof.

The memory 208 stores various forms of application software, such as a power conversion control module 212 for controlling power conversion by the MLPEs 114 and a data measurement module 214 for obtaining various data measured by the temperature sensor 120, the DC voltage monitoring circuit 122, and the DC current monitoring circuit 124. The memory 208 additionally stores a database 216 for storing data related to power conversion and/or the present invention. In various embodiments, the power conversion control module 212, the data measurement module 214, and the database 216, or portions thereof, may be implemented in software, firmware, hardware, or a combination thereof.

Figure 3:
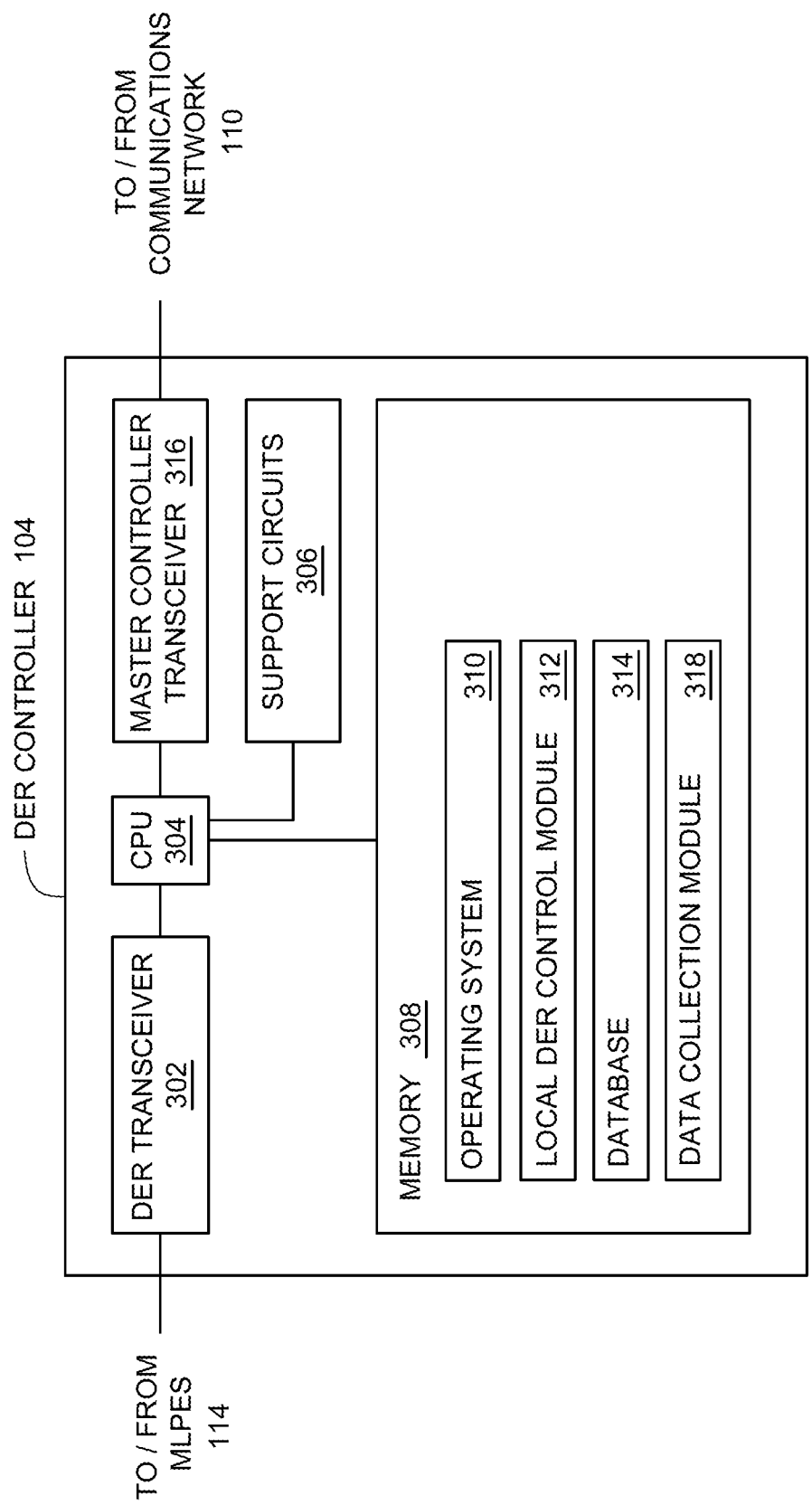
FIG. 3 is a block diagram of a DER controller in accordance with one or more embodiments of the present invention.

FIG. 3 is a block diagram of a DER controller 104 in accordance with one or more embodiments of the present invention. The DER controller 104 comprises a DER transceiver 302, a master controller transceiver 316, support circuits 306, and a memory 308 each coupled to at least one CPU 304. The CPU 304 may comprise one or more conventionally available microprocessors; additionally or alternatively, the CPU 304 may include one or more application specific integrated circuits (ASICs). In some embodiments, the CPU 304 may be a microcontroller comprising internal memory for storing controller firmware that, when executed, provides the controller functionality herein. The DER controller 104 may be implemented using a general purpose computer that, when executing particular software, becomes a specific purpose computer for performing various embodiments of the present invention.

The support circuits 306 are well known circuits used to promote functionality of the CPU 304. Such circuits include, but are not limited to, a cache, power supplies, clock circuits, buses, network cards, input/output (I/O) circuits, and the like.

The DER transceiver 302 is communicatively coupled to the MLPEs 114, e.g., via the AC bus 116. The master controller transceiver 316 is communicatively coupled to the master controller 108 via the communications network 110. The transceivers 302 and 316 may utilize wireless (e.g., based on standards such as IEEE 802.11, Zigbee, Z-wave, or the like) and/or wired (e.g., PLC) communication techniques for such communication, for example a WI-FI or WI-MAX modem, 3G modem, cable modem, Digital Subscriber Line (DSL), fiber optic, or similar type of technology.

The memory 308 may comprise random access memory, read only memory, removable disk memory, flash memory, and various combinations of these types of memory. The memory 308 is sometimes referred to as main memory and may, in part, be used as cache memory or buffer memory. The memory 308 generally stores an operating system (OS) 310 of the DER controller 104. The OS 310 may be one of a number of available operating systems for microcontrollers and/or microprocessors.

The memory 308 stores various forms of application software, such as a local DER control module 312 for providing operative control of the DER 102 (e.g., providing command instructions to the MLPEs 114 regarding power production levels), and a data collection module 318 for obtaining various data from the system 100, such as ambient and/or MLPE temperature, DC voltage, and DC current measured by the MLPEs 114. The data collection module 318 may additionally perform processing on received data, such as performing arithmetic computations.

The memory 308 additionally stores a database 314 for storing data, such as data related to the DER 102, one or more algorithms for operating on data, data pertaining to the DER 102 and/or the present invention, and the like. In various embodiments, the local DER control module 312, the data collection module 318, and the database 314, or portions thereof, may be implemented in software, firmware, hardware, or a combination thereof.

Figure 4:
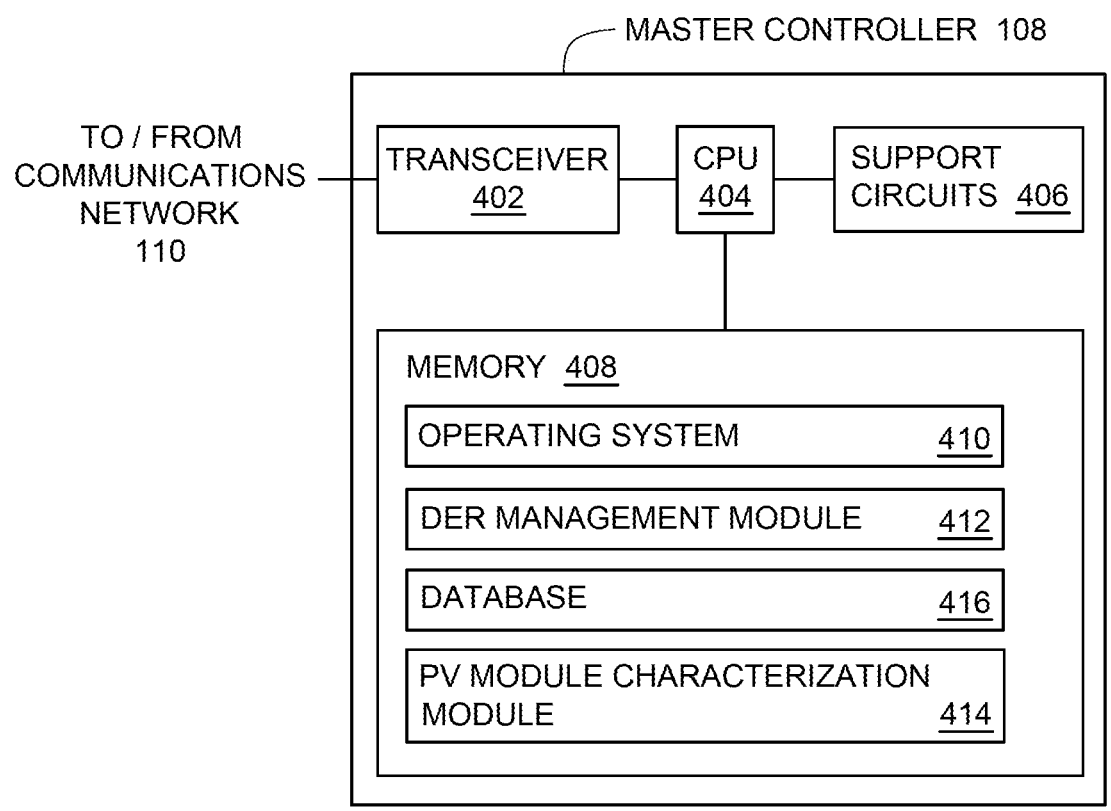
FIG. 4 is a block diagram of a master controller in accordance with one or more embodiments of the present invention.

FIG. 4 is a block diagram of a master controller 108 in accordance with one or more embodiments of the present invention. The master controller 108 comprises a transceiver 402, support circuits 406, and a memory 408 each coupled to at least one central processing unit (CPU) 404. The CPU 404 may comprise one or more conventionally available microprocessors; additionally or alternatively, the CPU 404 may include one or more application specific integrated circuits (ASICs). In some embodiments, the CPU 404 may be a microcontroller comprising internal memory for storing controller firmware that, when executed, provides the controller functionality described herein. The master controller 108 may be implemented using a general purpose computer that, when executing particular software, becomes a specific purpose computer for performing various embodiments of the present invention.

The support circuits 406 are well known circuits used to promote functionality of the CPU 404. Such circuits include, but are not limited to, a cache, power supplies, clock circuits, buses, network cards, input/output (I/O) circuits, and the like.

The transceiver 402 is communicatively coupled to the DER controller 104 via the communications network 110. The transceiver 402 may utilize wireless (e.g., based on standards such as IEEE 802.11, Zigbee, Z-wave, or the like) and/or wired communication techniques for such communication, for example a WI-FI or WI-MAX modem, 3G modem, cable modem, Digital Subscriber Line (DSL), fiber optic, PLC, or similar type of technology.

The memory 408 may comprise random access memory, read only memory, removable disk memory, flash memory, and various combinations of these types of memory. The memory 408 is sometimes referred to as main memory and may, in part, be used as cache memory or buffer memory. The memory 408 generally stores an operating system (OS) 410 of the master controller 108. The OS 410 may be one of a number of available operating systems for microcontrollers and/or microprocessors.

The memory 408 stores various forms of application software, such as a DER management module 412 for providing operative control of the DERs 102 (e.g., providing command instructions to the DER controllers 104 regarding power production levels). The memory 408 further comprises a PV module characterization module 414 for determining tkVmp, Vmp, Imp, and various characterizations pertaining to the PV modules 112 as described herein.

The memory 408 additionally stores a database 416 for storing data, such as data related to the operation of the DERs 102, data measurements from the DERs 102, one or more algorithms for generating characterizations pertaining to the PV module 112, and the like. In various embodiments, the DER management module 412, the PV module characterization module 414, and the database 416, or portions thereof, may be implemented in software, firmware, hardware, or a combination thereof.

In one or more alternative embodiments, some or all of the data calculations and the characterizations pertaining to the PV modules 112 may additionally or alternatively be done by the DER controller 104 or one or more of the MLPE controllers 130.

Figure 5:
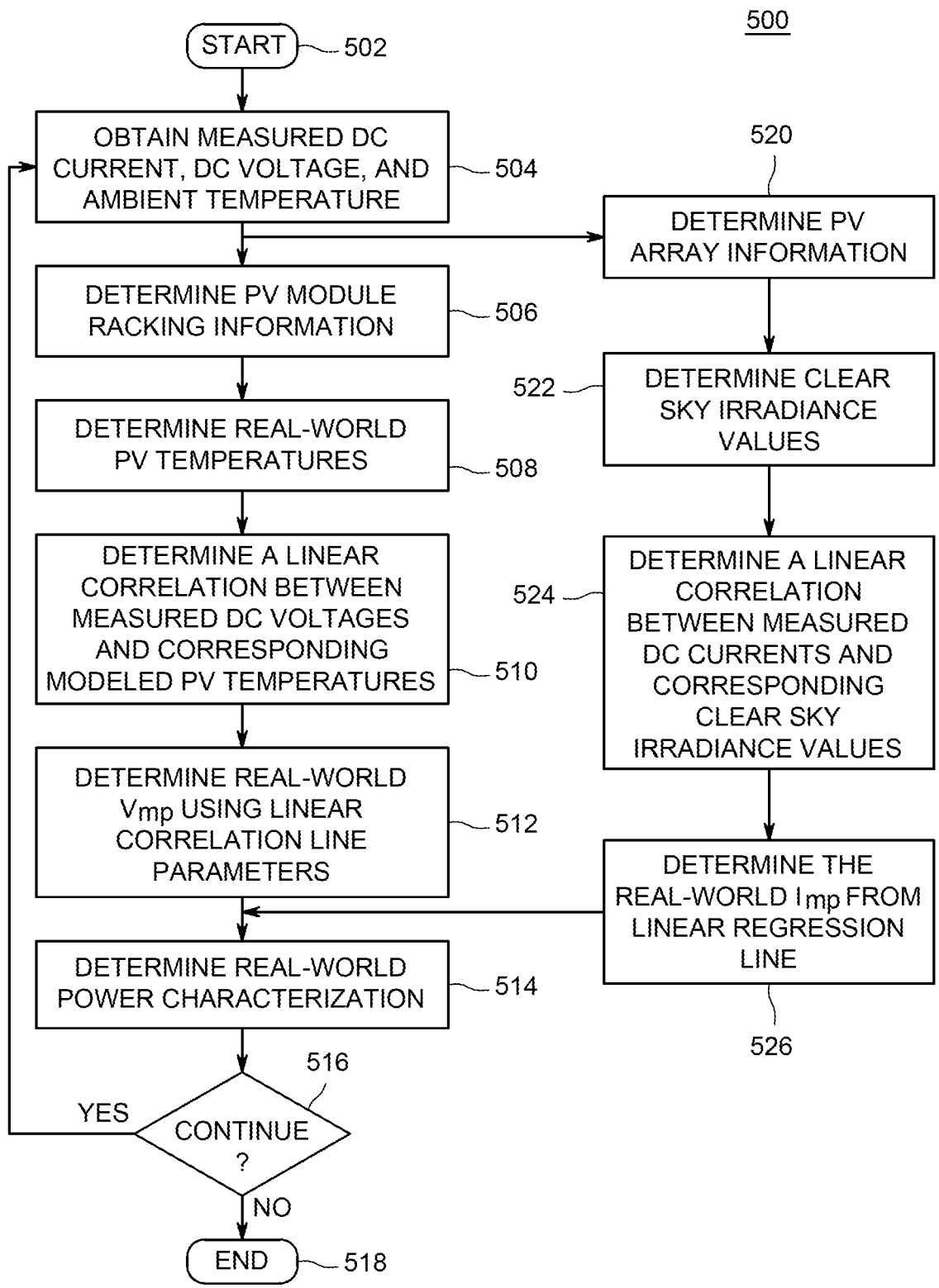
FIG. 5 is a flow diagram of a method for characterizing real-world operation of one or more PV modules in accordance with one or more embodiments of the present invention.

FIG. 5 is a flow diagram of a method 500 for characterizing real-world operation of one or more PV modules in accordance with one or more embodiments of the present invention. As described below, data from one or more MLPEs coupled to corresponding PV modules, such as the MLPEs 114/PV modules 112 of the DERs 102, is analyzed for computing a real-world MPP voltage Vmp, a real-world MPP current Imp, a real-world temperature coefficient tkVmp, and a real-world power characteristic for one or more PV modules. In some embodiments, the MLPE data may be obtained over time from a particular MLPE for characterizing the corresponding PV module. In other embodiments, MLPE data may be obtained from a plurality of MLPEs; in some of such embodiments, real-time data from the multiple MLPEs may be used to determine an instantaneous PV module characterization for the corresponding PV modules, while in other embodiments the data from multiple MLPEs may be obtained over time for analysis to characterize the corresponding PV modules.

In some embodiments, the method 500 is an implementation of the PV module characterization module 414 previously described. In other embodiments, part or all of the method 500 may be an implementation of a module within the MLPE controller 130 and/or the DER controller 104. In some embodiments, a computer readable medium comprises a program that, when executed by a processor, performs the method 500.

The method 500 begins at step 502 and proceeds to step 504. At step 504, measured DC current, measured DC voltage, and measured ambient and/or MLPE temperature data are obtained from one or more MLPEs. The measured data may be real-time data, i.e., measured by one or more MLPEs in real-time (or near real-time); alternatively, the data may be measured by the one or more MLPEs periodically. The measured data may be obtained from the one or more MLPEs as it's measured; additionally or alternatively, some or all of the measured data may be stored by the corresponding MLPE and periodically obtained.

The method 500 proceeds from step 504 to each of steps 506 and 520.

At step 506, PV module racking information is obtained. The PV module racking information identifies the racking design for the one or more PV modules being characterized, for example open rack, close roof mount, Insulated back, or the like. The racking information may be stored in and obtained from one or more of the MLPEs, the DER controller, or the master controller for the system.

The method 500 proceeds from step 506 to step 508. At step 508, the measured temperature data and the PV module racking information are used to determine corresponding real-world PV module temperatures. The MLPE-measured temperature and system racking information are input to a temperature model used to infer a temperature of the PV module at the time the MLPE-measured temperature is determined. In some embodiments, the temperature model is any suitable temperature model known in the art.

The method 500 proceeds from step 508 to step 510. At step 510, a linear correlation between the measured DC voltage data and the corresponding real-world PV module temperature data is determined. In some embodiments, each real-world PV module temperature value is plotted versus the corresponding DC voltage (i.e., the DC voltage measured at or near the time of the MLPE temperature measurement used to determine a particular real-world PV module temperature value) to determine the linear correlation. The plurality of real-world PV module temperature values may be determined for one or more PV modules of the same type in the DER and/or for different times of day.

One or more statistical analysis techniques may be applied to the real-world PV module temperature values/corresponding measured DC voltage values to determine a linear correlation with respect to the data. For example, in some embodiments a machine learning algorithm (e.g., a shallow machine learning algorithm, a random sample consensus (RANSAC) algorithm, or the like), may be used to perform a linear regression to determine the best-fitting line with respect to the data. The resulting linear regression line slope correlates with a real-world temperature coefficient tkVmp for the type of PV module modeled. For a particular temperature value for a PV module, the corresponding real-world Vmp can then be computed.

Figure 6:
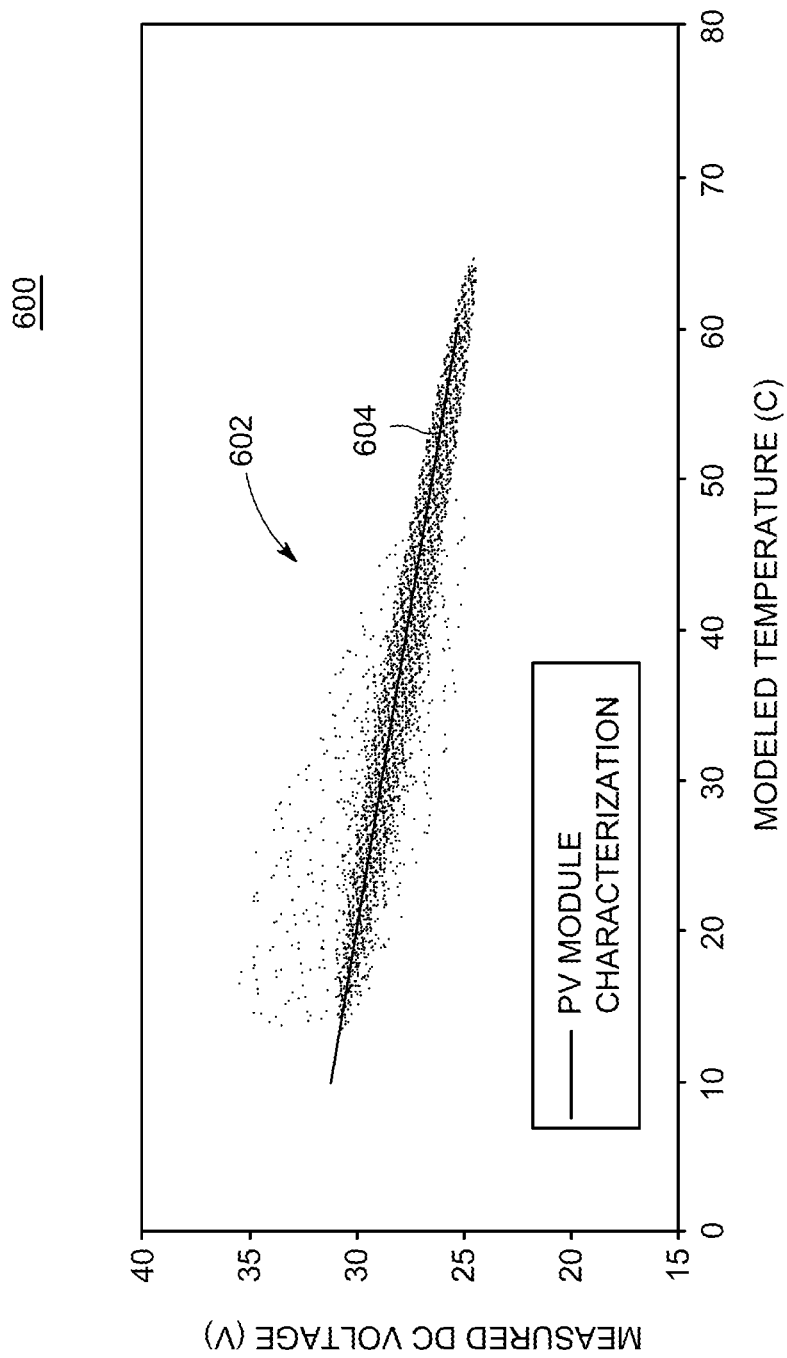
FIG. 6 is a graph of real-world PV module temperature values versus corresponding measured DC voltages in accordance with one or more embodiments of the present invention.

FIG. 6, which is described below, depicts one embodiment of a graph showing the real-world PV module temperatures versus corresponding measured DC voltages and the determined linear regression line.

The method 500 proceeds to step 512. At step 512, the linear regression line equation parameters, i.e., the slope and y-intercept, are used to determine a real-world MPP voltage characteristic for the PV module by using the datasheet MPP voltage STC temperature (e.g., 25° C.) as the independent variable in the linear regression line formula. In some embodiments, the datasheet MPP voltage STC temperature may be stored in one or more of the corresponding MLPE, the DER controller, or the master controller for the system.

The method 500 proceeds from step 512 to step 514, which is described further below.

At step 520, which the method 500 proceeds to from step 504, PV array position information for the one or more PV modules being characterized is determined. The PV array position information may include information such as one or more of site elevation, latitude, longitude, reference longitude, tilt, and azimuth. The PV array position information may be stored in and obtained from one or more of the corresponding MLPEs, the DER controller, or the master controller for the system.

The method 500 proceeds from step 520 to step 522. At step 522, the PV array position information and measured temperature values are used to determine clear sky irradiance values. The PV array position information and measured temperature values are input to a clear sky irradiance model to determine the clear sky irradiance values. In some embodiments, the clear sky irradiance model used may be any suitable clear sky irradiance model known in the art.

The method 500 proceeds from step 522 to step 524. At step 524, a linear correlation between the determined clear sky irradiance values and the corresponding measured DC current values (i.e., the DC current measured at or near the time of the MLPE temperature measurement used to determine a particular clear sky irradiance value) are determined. In some embodiments, each modeled clear sky irradiance value and the corresponding DC current value are plotted to determine the linear correlation. The modeled clear sky irradiance values may be determined for one or more PV modules of the same type in the DER and/or for different times of day.

Figure 7:
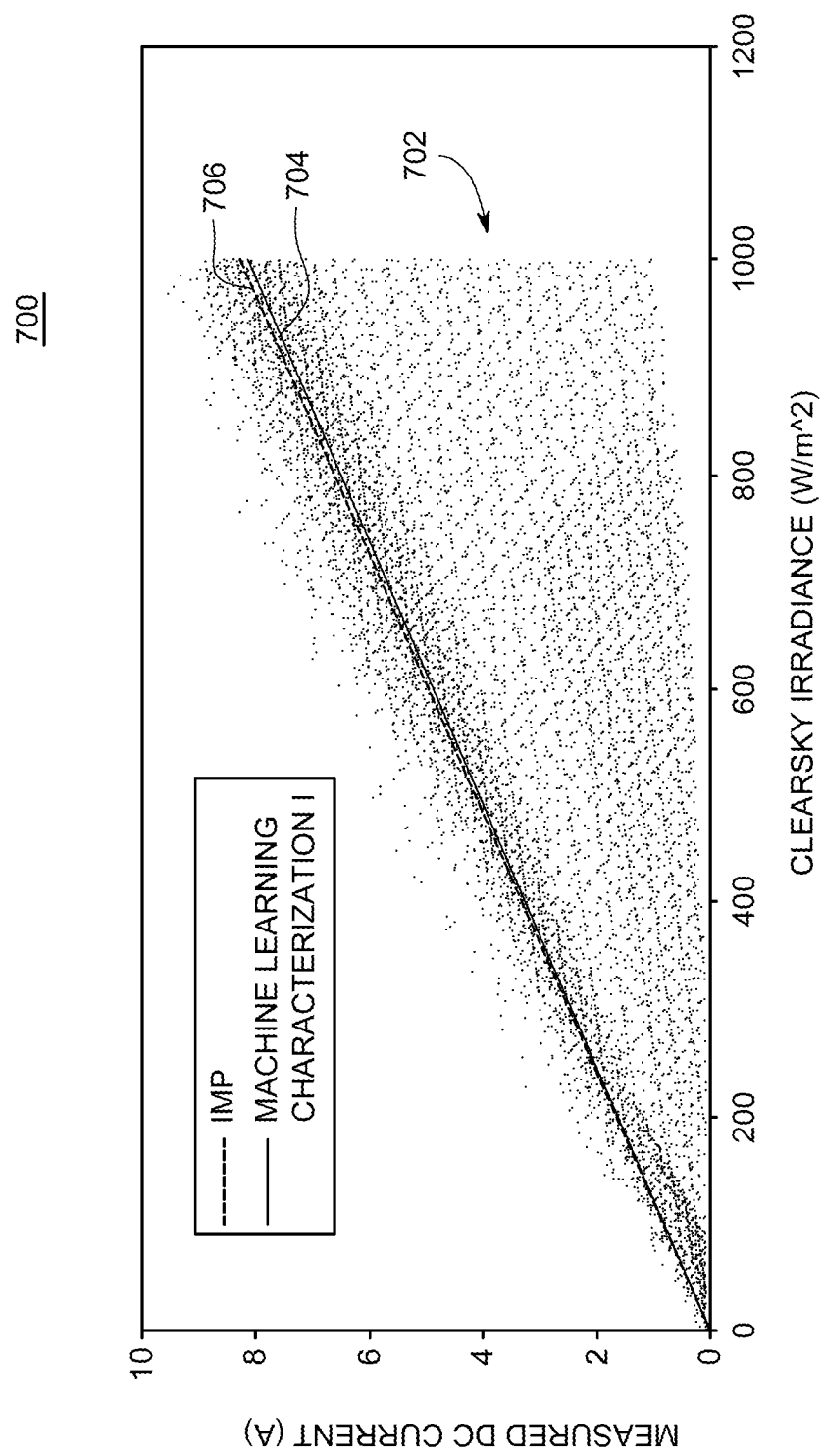
FIG. 7 depicts one embodiment of modeled clear sky irradiance values/corresponding measured DC current values and the determined linear regression line.

One or more statistical analysis techniques may be applied to the modeled clear sky irradiance values/corresponding measured DC current values to determine a linear correlation with respect to the data. For example, in some embodiments a machine learning algorithm (e.g., a shallow machine learning algorithm, a random sample consensus (RANSAC) algorithm, or the like), may be used to perform a linear regression to determine the best-fitting line with respect to the data. FIG. 7, which is described below, depicts one embodiment of the modeled clear sky irradiance values/corresponding measured DC current values and the determined linear regression line.

At step 526, the linear regression line equation parameters, i.e., the slope and y-intercept, are used to determine a real-world MPP current characteristic for the PV module by using the datasheet STC irradiance value (e.g., 1000 W/m²) as the independent variable in the linear regression line formula. In some embodiments, the datasheet STC irradiance value may be stored in one or more of the corresponding MLPE, the DER controller, or the master controller for the system. The method 500 proceeds from step 526 to step 514.

At step 514, a real-world power characterization, Pmp, is determined by multiplying the real-world MPP voltage Vmp by the real-world MPP current Imp. One or more of the real-world PV module characterization parameters Vmp, Imp, tkVmp, and Pmp can be used, for example, in determining whether a PV module is performing as contracted by the manufacturer. Additionally or alternatively, the real-world power characterization parameters may be recomputed over time to determine how PV module performance changes over time. In some embodiments, the real-world power characterization Pmp may be computed for each of multiple groupings of PV modules (e.g., for DERs) within geographic proximity and compared to identify deviations from expected performance.

The method 500 proceeds to step 516 where a determination is made whether to continue. If the result of the determination is yes, the method 500 returns to step 504. If the result of the determination is no, the method 500 proceeds to step 518 where it ends.

In some alternative embodiments, some of the method steps may not be performed. For example, in certain alternative embodiments only a real-world MPP current Imp is needed and the steps 506-514 are not performed. In other alternative embodiments, only a real-world MPP voltage Vmp is needed and the steps 520-526 are not performed.

FIG. 6 is a graph 600 of real-world PV module temperature values versus corresponding measured DC voltages in accordance with one or more embodiments of the present invention. The graph 600 comprises a plurality of data points 602, where each of the data points 602 represents a real-world PV module temperature value in degrees Celsius (on the x-axis) versus a corresponding measured DC voltage value in volts (on the y-axis). The data points 602 are obtained as previously described with respect to FIG. 5.

The graph 600 further comprises a linear regression line 604 fit to the data points 602. The linear regression line 604 is obtained by a linear regression technique as previous described with respect to FIG. 5.

The graph 700 further comprises a linear regression line 704 fit to the data points 702. The linear regression line 704 is obtained by a linear regression technique as previously described with respect to FIG. 5. FIG. 7 depicts a graph 700 of clear sky irradiance values plotted versus corresponding measured DC current values in accordance with one or more embodiments of the present invention. The graph 700 comprises a plurality of data points 702, where each of the data points 702 represents a modeled clear sky irradiance value in watts per square meter (on the x-axis) versus a corresponding measured DC current value in amps (on the y-axis). The data points 702 are obtained as previously described with respect to FIG. 5. One or more statistical analysis techniques may be applied to the clear sky irradiance values/corresponding measured DC current values to determine a linear correlation with respect to the data. For example, in some embodiments a machine learning algorithm (e.g., a shallow machine learning algorithm, a random sample consensus (RANSAC) algorithm, or the like), may be used to perform a linear regression to determine the best-fitting line 704 with respect to the data, as depicted in FIG. 7, such that the resulting line slope correlates with a real-world Imp. The graph 700 further depicts a line 706, which is representative of a PV module manufacturer-provided characterization for Imp.

Once both the real-world Imp and real-world Vmp are determined, a real-world power characteristic for a type of PV module can be determined and compared with manufacturer specifications. Additionally, the real-world power characteristic can be re-computed over time to determine how performance of the PV module changes over time.

Further, having characterized the relationship of DC current to irradiance, a global horizontal irradiance (GHI) measurement can be calculated, for example as described below with respect to FIGS. 8 and 9. Using GHI, systems at different tilts and azimuths can be compared; for those systems that are geographically close to one another, a particular module at a tilt & azimuth can be compared it a different module at a different tilt & azimuth. As such, systems in geographic proximity can be bench-marked with respect to each other and individual deviations from expected performance can be determined without requiring weather stations/separate weather sensors to be deployed at the PV module systems.

This allows the observation of long term module shunt loss behavior, such as degradation and soiling. Additionally, FIGS. 10 and 11, described below, depict obtaining a performance ratio and an exemplary output showing performance ratio over time.

Figure 8:
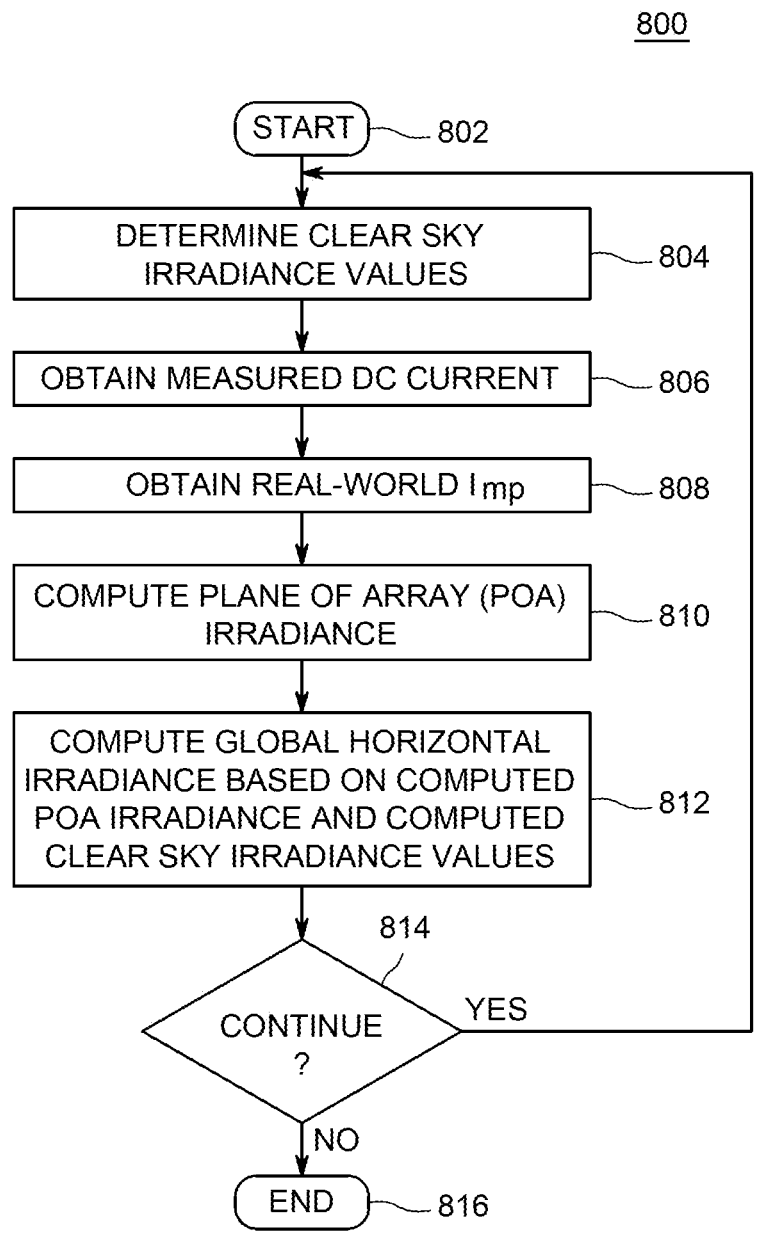
FIG. 8 is a flow diagram of a method for computing a global horizontal irradiance (GHI) in accordance with one or more embodiments of the present invention.

FIG. 8 is a flow diagram of a method 800 for computing a global horizontal irradiance (GHI) in accordance with one or more embodiments of the present invention. Analogous to the method 500, MLPE data from one or more MLPEs, such as MLPEs 114 of the DERs 102, is used in determining the computed GHI. In some embodiments, the computed GHI may be determined using MLPE data obtained over time from a particular MLPE. In other embodiments, the computed GHI may be determined using MLPE data obtained from a plurality of MLPEs; for example, the GHI may be computed using data obtained from the plurality of MLPEs at a particular time or data obtained from the plurality of MLPEs over time.

In some embodiments, the method 800 is an implementation of the PV module characterization module 414 previously described. In other embodiments, part or all of the method 800 may be an implementation of a module of the MLPE controller 130 and/or the DER controller 104. In some embodiments, a computer readable medium comprises a program that, when executed by a processor, performs the method 800.

The method 800 begins at step 802 and proceeds to step 804. At step 804, a plurality of clear sky irradiance values are determined as previously described in steps 520-522 of the method 500. The method 800 proceeds from step 804 to step 806. At step 806, measured DC current values are obtained as previously described in step 504 of the method 500.

The method 800 proceeds to step 808. At step 808, values of real-world MPP current Imp are determined as previously described in the method 500.

At step 810, the plane of array (POA) irradiance, which is a measure of the total amount of solar energy that is available to an array, is computed using the measured DC current values and the computed real-world MPP current values. The method 800 proceeds to step 812, where the GHI is computed based on the clear sky irradiance values and the computed POA. The GHI may be computed using various algorithms/methodolgoies; for example, a polynomial mathematical function may be used, or a trained model may be used.

The method 800 proceeds from step 812 to step 814 where a determination is made whether to continue. If the result of the determination is yes, the method 800 returns to step 804; if the result of the determination is no, the method 800 proceeds to 816 where it ends.

Figure 9:
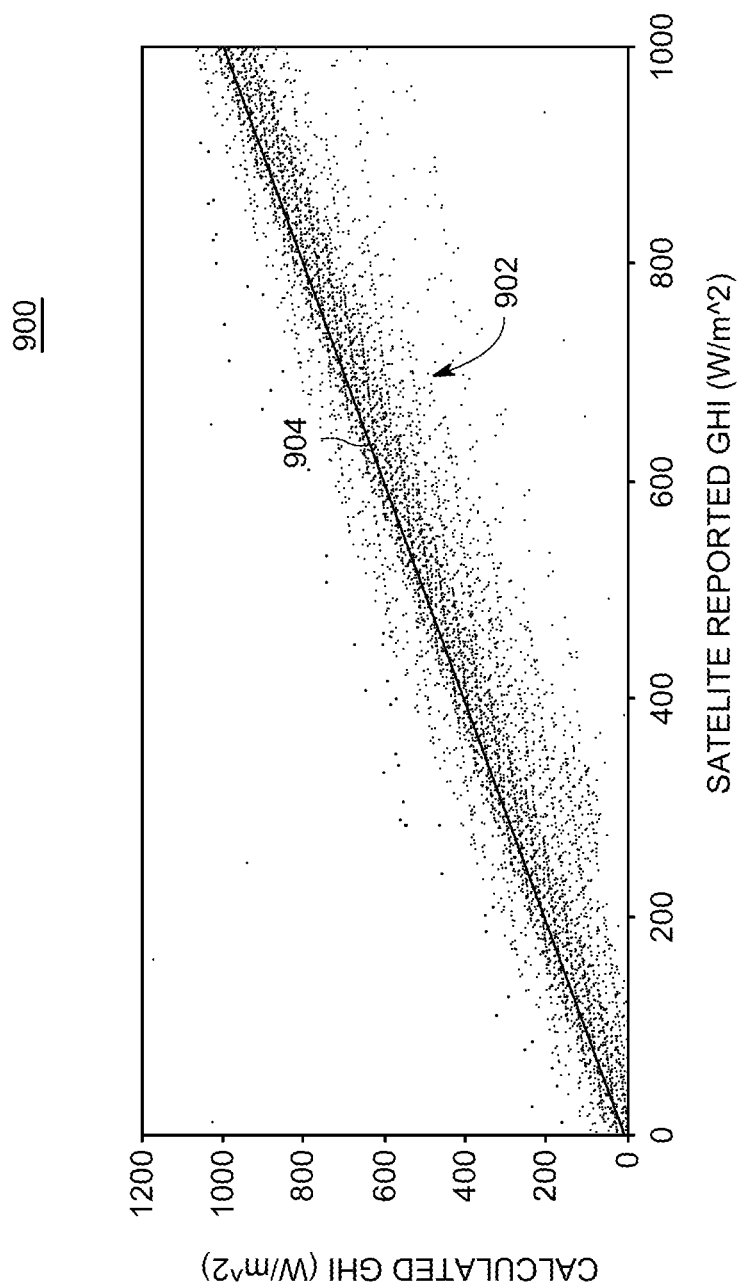
FIG. 9 is a graph of satellite-reported GHI values plotted versus corresponding computed GHI values in accordance with one or more embodiments of the present invention.

FIG. 9 is a graph 900 of satellite-reported GHI values plotted versus corresponding computed GHI values in accordance with one or more embodiments of the present invention. The graph 900 comprises a plurality of data points 902, where each of the data points 902 represents a satellite-reported GHI value in watts per square meter (on the x-axis) and a corresponding computed GHI value in watts per square meter (on the y-axis). The computed GHI values for the data points 902 are obtained as previously described with respect to FIG. 8. The satellite-reported GHI values may be obtained via any number of providers.

The graph 900 further comprises a theoretical perfect correlation 904 showing the linear relationship between satellite-reported GHI values and computed GHI.

Figure 10:
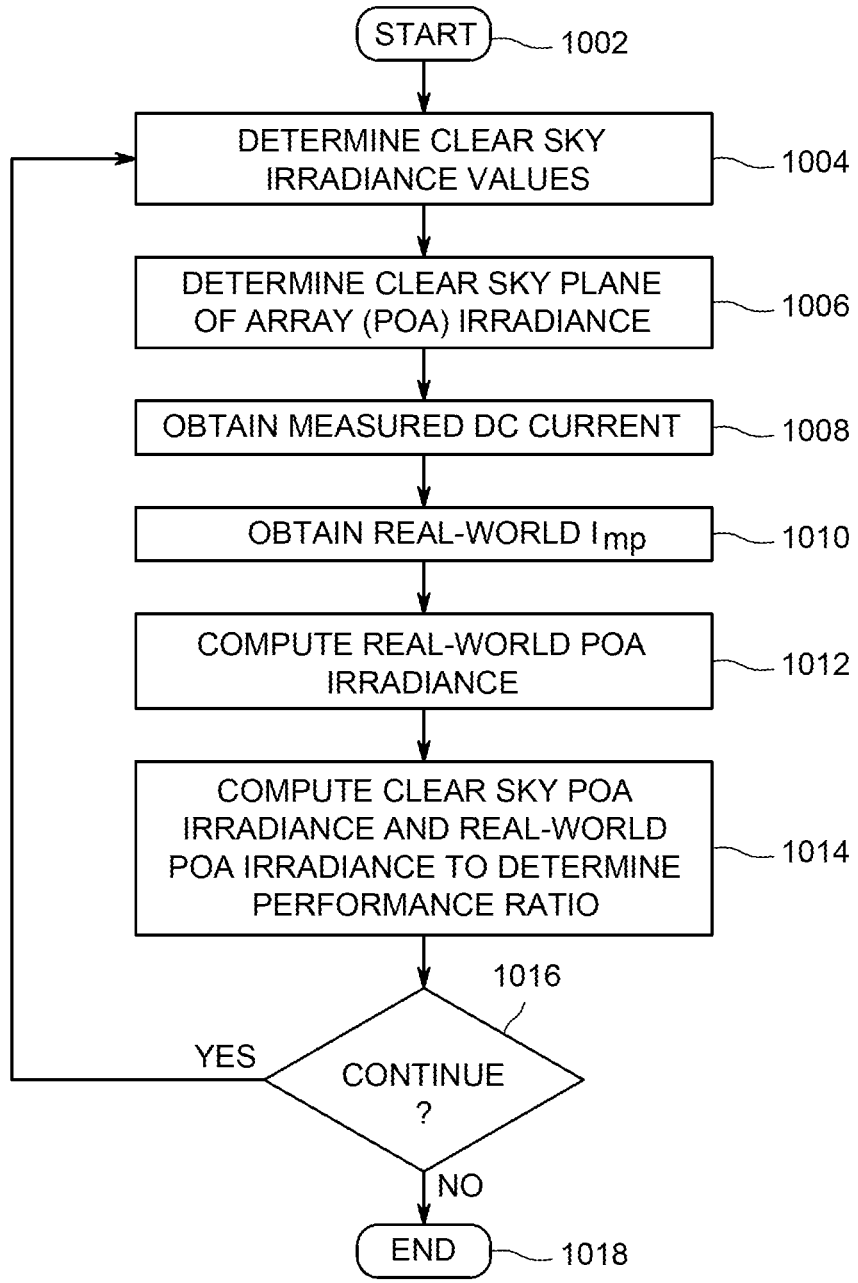
FIG. 10 is a flow diagram of a method for determining a performance ratio comparing predicted clear sky POA irradiance values to real-world POA irradiance values in accordance with one or more embodiments of the present invention.

FIG. 10 is a flow diagram of a method 1000 for determining a performance ratio comparing predicted clear sky POA irradiance values to real-world POA irradiance values in accordance with one or more embodiments of the present invention. Analogous to the method 500, data from one or more MLPEs, such as MLPEs 114 of the DERs 102, is used in determining the real-world POA irradiance values. In some embodiments, the real-world POA irradiance values may be determined using MLPE data obtained over time from a particular MLPE. In other embodiments, the real-world POA irradiance values may be determined using MLPE data obtained from a plurality of MLPEs; for example, the real-world POA irradiance values may be computed using data obtained from the plurality of MLPEs at a particular time or data obtained from the plurality of MLPEs over time.

In some embodiments, the method 1000 is an implementation of the PV module characterization module 414 previously described. In other embodiments, part or all of the method 1000 may be an implementation of a module of the MLPE controller 130 and/or the DER controller 104. In some embodiments, a computer readable medium comprises a program that, when executed by a processor, performs the method 1000.

The method 1000 begins at step 1002 and proceeds to step 1004. At step 1004, a plurality of clear sky irradiance values are determined as previously described in steps 520-522 of the method 500. The method 1000 proceeds from step 1004 to step 1006. At step 1006, the clear sky irradiance values are used to compute the clear sky POA irradiance values using, for example, a model known in the art. The method 1000 proceeds to step 1008.

At step 1008, measured DC current values are obtained as previously described in step 504 of the method 500. The method 1000 proceeds to step 1010. At step 1010, real-world MPP current Imp values are determined as previously described in the method 500. The method 1000 proceeds to step 1012 where the real-world POA irradiance is computed using the measured DC current values and the real-word Imp values as previously described in step 810 of the method 800.

The method 1000 proceeds to step 1014. At step 1014, the computed clear sky POA irradiance values and the real-world POA irradiance values are compared to determine performance ratio values. FIG. 12, described below, depicts exemplary performance ratio values over time for one particular embodiment.

The method 1000 proceeds to step 1016 where a determination is made whether to continue. If the result of the determination is yes, the method 1000 returns to step 1004. If the result of the determination is no, the method 1000 proceeds to step 1018 where it ends.

Figure 11:
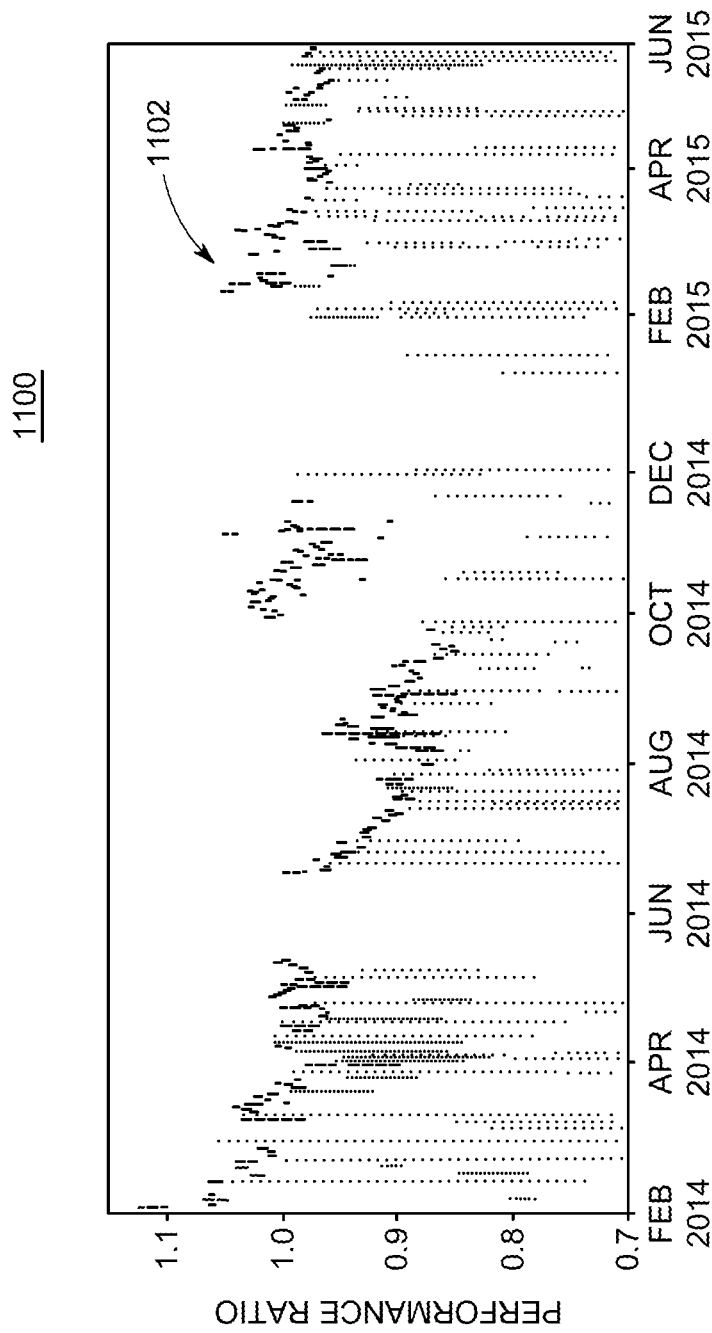
FIG. 11 is a graph depicting performance ratio values comparing computed clear sky POA irradiance values with corresponding real-world POA irradiance values in accordance with one or more embodiments of the present invention.

FIG. 11 is a graph 1100 depicting performance ratio values comparing computed clear sky POA irradiance values with corresponding real-world POA irradiance values in accordance with one or more embodiments of the present invention. The graph 1100 comprises a plurality of performance ratio values 1102, computed as in the method 1000 described above, plotted over the time period February 2014 through June 2015.

While the foregoing is directed to embodiments of the present invention, other and further embodiments of the invention may be devised without departing from the basic scope thereof, and the scope thereof is defined by the claims that follow.

The invention claimed is:

1. A method of using module-level power electronics (MLPE) data for characterizing real-world operation photovoltaic (PV) modules, comprising:
    obtaining a plurality of MLPE temperature measurements from a plurality of MLPEs, each MLPE of the plurality of MLPEs proximate to a PV module of a plurality of PV modules, wherein each MLPE temperature measurement of the plurality of MLPE temperature measurements is a measure, by an MLPE of the plurality of MLPEs, of MLPE temperature;
    obtaining a plurality of DC voltage measurements from the plurality of MLPEs, wherein each DC voltage measurement of the plurality of DC voltage measurements corresponds to an MLE temperature measurement of the plurality of MLPE temperature measurements;

obtaining racking design information with respect to the plurality of PV modules;

inputting the plurality of MLPE temperature measurements and the racking design information to a temperature model;

inferring, based on the temperature model, a plurality of PV module temperatures for the plurality of PV modules; and determining a correlation between the plurality of DC voltage measurements and the plurality of inferred PV module temperatures.

2. The method of claim 1, wherein determining the correlation comprises determining an equation for a linear regression line with respect to the plurality of DC voltage measurements and the plurality of inferred PV module temperatures.

3. The method of claim 2, further comprising computing a real-world maximum power point (MPP) voltage using the equation for the linear regression line and a temperature value used to determine a PV module MPP voltage under Standard Test Conditions (STC).

4. The method of claim 3, further comprising:
obtaining PV array position information with respect to the plurality of PV modules; and
determining, using a clear sky irradiance model, a plurality of clear sky irradiance values based on the PV array position information and the plurality of MLPE temperature measurements.

5. The method of claim 4, further comprising:
obtaining a plurality of DC current measurement from the plurality of MLPEs, wherein each DC current measurement of the plurality of DC current measurements is a measure by an MLPE of the plurality of MLPEs of a DC current received from a corresponding PV module; and
determining an equation for a second linear regression line with respect to the plurality of clear sky irradiance values and corresponding DC current measurements from the plurality of DC current measurements.

6. The method of claim 5, further comprising computing a real-world MPP current using the equation for the second linear regression line and an irradiance value used to determine a PV module MPP current under STC.

7. The method of claim 6, further comprising computing a real-world PV module power characteristic using the real-world MPP current and the real-world MPP voltage.

8. Apparatus for using module-level power electronics (MLPE) data for characterizing real-world operation photovoltaic (PV) modules, comprising:
a controller, comprising at least one processor, for:
obtaining a plurality of MLPE temperature measurements from a plurality of MLPEs, each MLPE of the plurality of MLPEs proximate to a PV module of a plurality of PV modules, wherein each MLPE temperature measurement of the plurality of MLPE temperature measurements is a measure, by an MLPE of the plurality of MLPEs, of MLPE temperature;
obtaining a plurality of DC voltage measurements from the plurality of MLPEs, wherein each DC voltage measurement of the plurality of DC voltage measurements corresponds to an MLE temperature measurement of the plurality of MLPE temperature measurements;
obtaining racking design information with respect to the plurality of PV modules;
inputting the plurality of MLPE temperature measurements and the racking design information to a temperature model;
inferring, based on the temperature model, a plurality of PV module temperatures for the plurality of PV modules; and
determining a correlation between the plurality of DC voltage measurements and the plurality of inferred PV module temperatures.

9. The apparatus of claim 8, wherein determining the correlation comprises determining an equation for a linear regression line with respect to the plurality of DC voltage measurements and the plurality of inferred PV module temperatures.

10. The apparatus of claim 9, further comprising computing a real-world maximum power point (MPP) voltage using the equation for the linear regression line and a temperature value used to determine a PV module MPP voltage under Standard Test Conditions (STC).

11. The apparatus of claim 10, further comprising:
obtaining PV array position information with respect to the plurality of PV module; and
determining, using a clear sky irradiance model, a plurality of clear sky irradiance values based on the PV array position information and the plurality of MLPE temperature measurements.

12. The apparatus of claim 11, further comprising:
obtaining a plurality of DC current measurements from the plurality of MLPEs wherein each DC current measurement of the plurality of DC current measurements is a measure by an MLPE of the plurality of MLPEs of a DC current received from the corresponding PV module; and
determining an equation for a second linear regression line with respect to the plurality of clear sky irradiance values and corresponding DC current measurements from the plurality of DC current measurements.

13. The apparatus of claim 12, further comprising computing a real-world MPP current using the equation for the second linear regression line and an irradiance value used to determine a PV module MPP current under STC.

14. The apparatus of claim 13, further comprising computing a real-world PV module power characteristic using the real-world MPP current and the real-world MPP voltage.

15. A nontransitory computer readable medium comprising a program that, when executed by a processor, performs a method of using module-level power electronics (MLPE) data for characterizing real-world operation photovoltaic (PV) modules, the method comprising:
obtaining a plurality of MLPE temperature measurements from a plurality of MLPEs, each MLPE of the plurality of MLPEs proximate to a PV module of a plurality of PV modules, wherein each MLPE temperature measurement of the plurality of MLPE temperature measurements is a measure, by an MLPE of the plurality of MLPEs, of MLPE temperature;
obtaining a plurality of DC voltage measurements from the plurality of MLPEs, wherein each DC voltage measurement of the plurality of DC voltage measurements corresponds to an MLE temperature measurement of the plurality of MLPE temperature measurements;
obtaining racking design information with respect to the plurality of PV modules;
inputting the plurality of MLPE temperature measurements and the racking design information to a temperature model;

inferring, based on the temperature model, a plurality of PV module temperatures for the plurality of PV modules; and determining a correlation between the plurality of DC voltage measurements and the plurality of inferred PV module temperatures.

16. The nontransitory computer readable medium of claim 15, wherein determining the correlation comprises determining an equation for a linear regression line with respect to the plurality of DC voltage measurements and the plurality of modeled PV module temperatures.

17. The nontransitory computer readable medium of claim 16, the method further comprising computing a real-world maximum power point (MPP) voltage using the equation for the linear regression line and a temperature value used to determine a PV module MPP voltage under Standard Test Conditions (STC).

18. The nontransitory computer readable medium of claim 17, the method further comprising:
obtaining PV array position information with respect to the plurality of PV modules; and
determining, using a clear sky irradiance model, a plurality of clear sky irradiance values based on the PV array position information and the plurality of MLPE temperature measurements.

19. The nontransitory computer readable medium of claim 18, the method further comprising:
obtaining a plurality of DC current measurements from the plurality of MLPEs, wherein each DC current measurement of the plurality of DC current measurements is a measure by and MLPE of the plurality of MLPEs of a DC current received from a corresponding PV module; and determining an equation for a second linear regression line with respect to the plurality of clear sky irradiance values and corresponding DC current measurements from the plurality of DC current measurements.

20. The nontransitory computer readable medium of claim 19, the method further comprising computing a real-world MPP current using the equation for the second linear regression line and an irradiance value used to determine a PV module MPP current under STC; and computing a real-world PV module power characteristic using the real-world MPP current and the real-world MPP voltage.

* * * * *